United States Patent [19]

Weigand et al.

[11] 4,106,270
[45] Aug. 15, 1978

[54] FOUR ROW FORAGE HARVESTER

[75] Inventors: Rex Olen Weigand, Newton; Kenneth Ray McMillen, Canton; Ronald Dean Fulk, Hesston; Daniel Ray Prichard; Jack Merriel Kountz, both of Wichita, all of Kans.

[73] Assignee: Hesston Corporation, Hesston, Kans.

[21] Appl. No.: 678,674

[22] Filed: Apr. 20, 1976

[51] Int. Cl.² ............................................. A01D 45/02
[52] U.S. Cl. ......................................................... 56/98
[58] Field of Search ...................... 56/98, 94, 106, 108

[56] References Cited

U.S. PATENT DOCUMENTS

| 3,791,117 | 2/1974 | Lawrence | 56/98 |
| 3,940,913 | 3/1976 | Wallenfang et al. | 56/98 |
| 3,961,466 | 6/1976 | Martin et al. | 56/98 |

FOREIGN PATENT DOCUMENTS 1,407,716  7/1961  Fed. Rep. of Germany .............. 56/98

*Primary Examiner*—Russell R. Kinsey
*Attorney, Agent, or Firm*—Schmidt, Johnson, Hovey & Williams

[57] ABSTRACT

The gathering units of the harvesting header diverge downwardly and forwardly from a common discharge zone at the upper rear end of the header, the two middle units being disposed in a plane below that of the two outer units and having their upper crop discharge outlets spaced forwardly from the corresponding discharge outlets of the outer units. The conveying elements of the outer units at least partially overlap conveying elements of the two inner gathering units adjacent the discharge outlets of the latter. Each gathering unit has its own individual standing crop cutter assembly, the assemblies of the two inner units being set back with respect to those of the outer units but being substantially the same height for uniform stubble height. Each assembly has a rotary cutter in combination with a stationary shear plate, both of which are mounted on the same side of the crop conveying passage of the unit.

17 Claims, 6 Drawing Figures

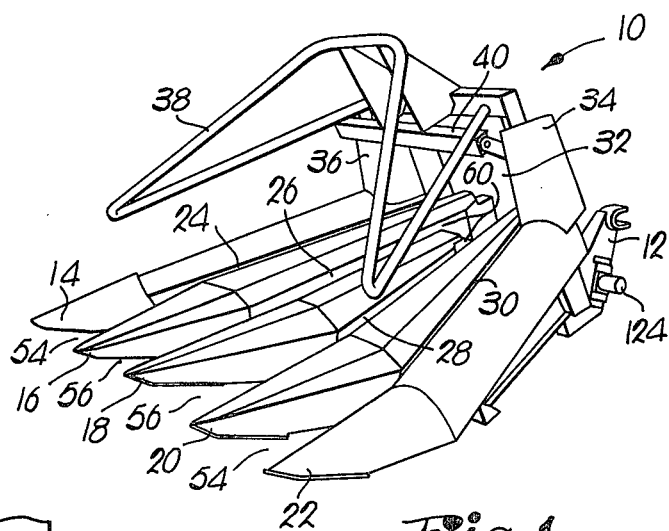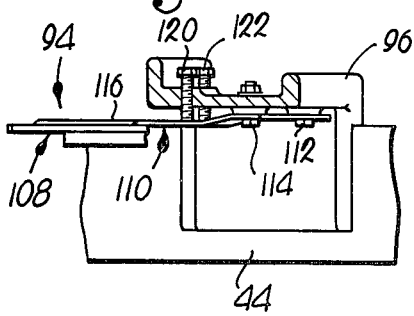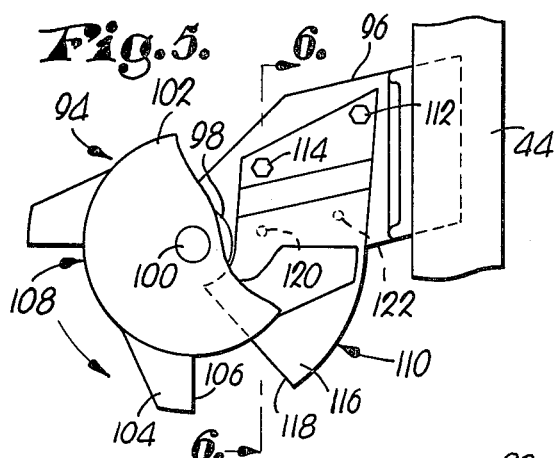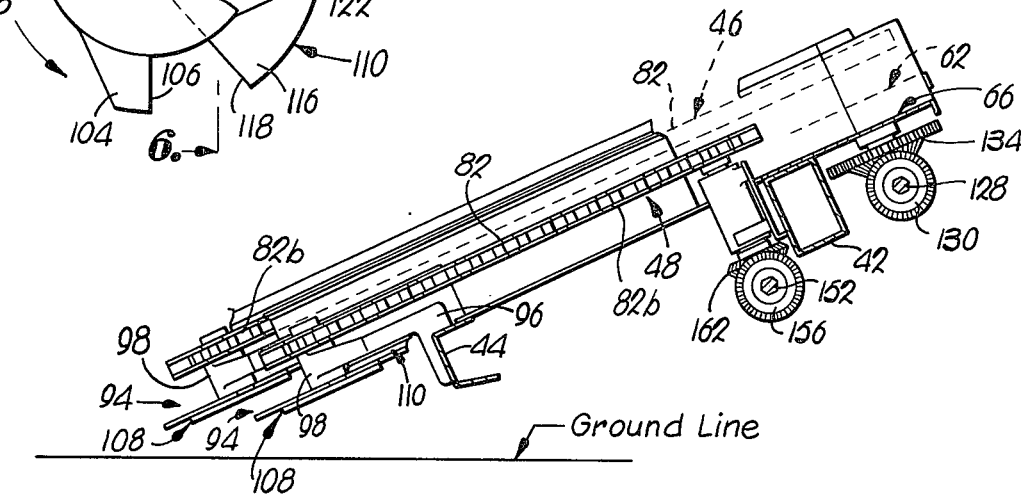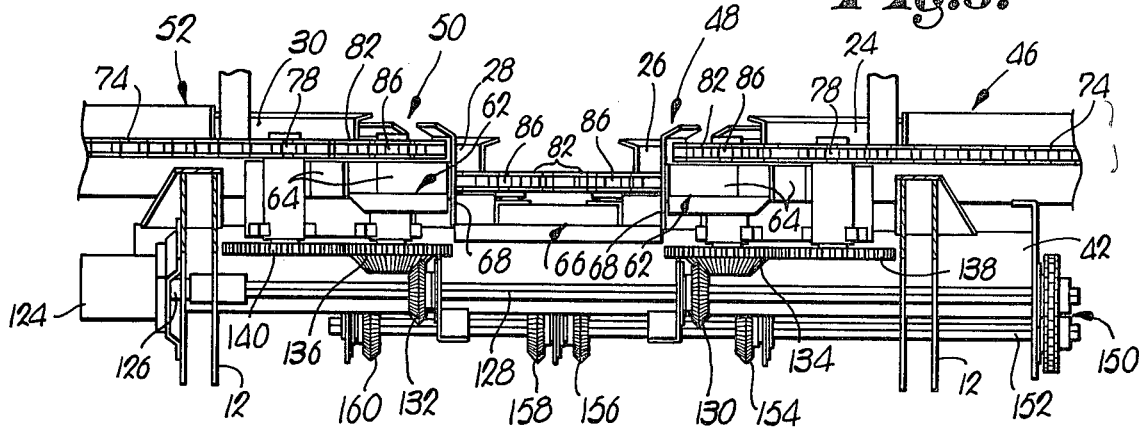

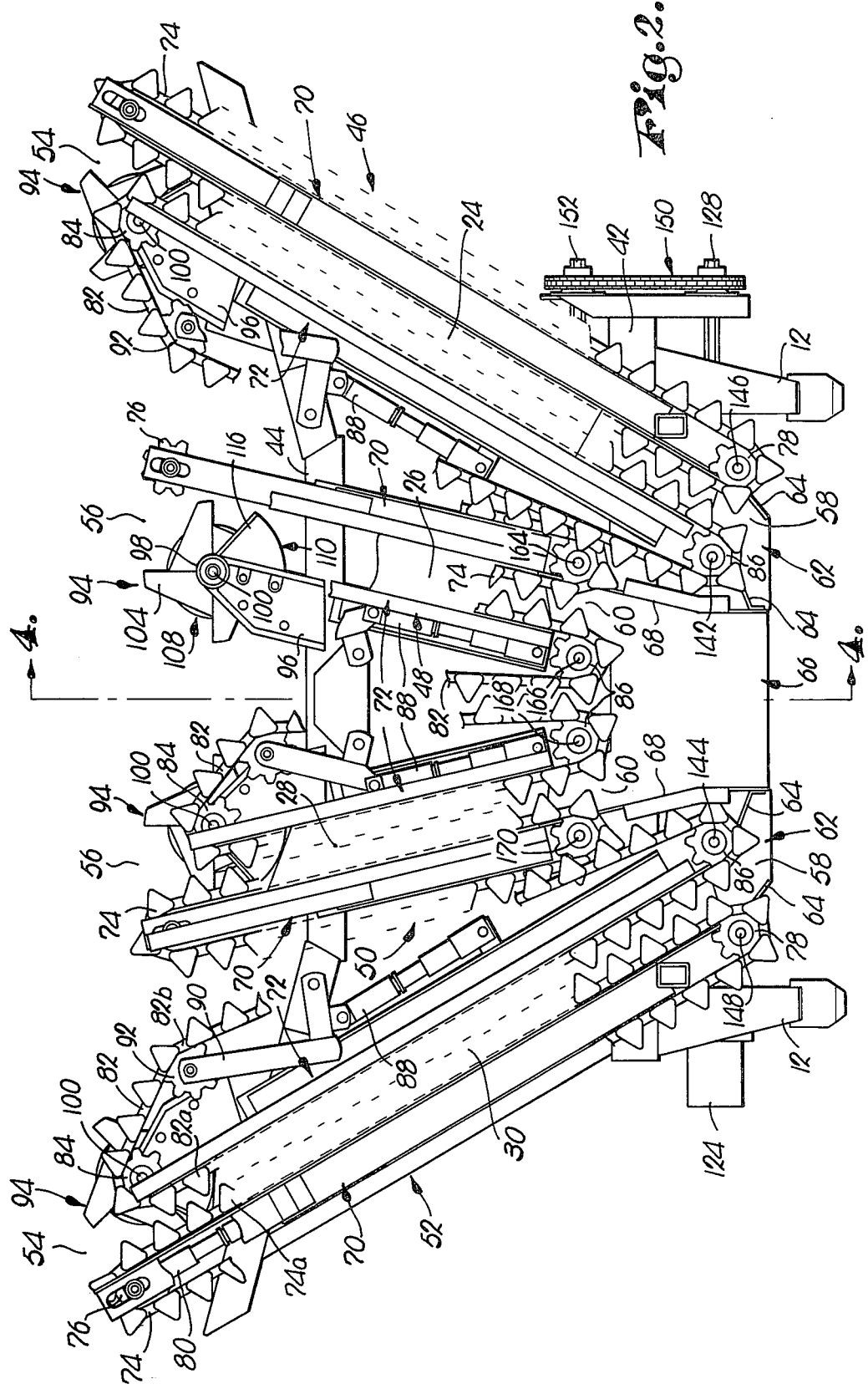

FOUR ROW FORAGE HARVESTER

This invention relates to multi-row forage harvesting headers and has as one important object to provide an improved way of converging several individual rows of severed crop stalks upwardly and rearwardly to a relatively narrow discharge zone in an orderly, clog-free manner for presentation to feed rolls which compress the stalks and project them rearwardly into a spinning, reel-type chopping cylinder.

It has always been a difficult problem in multi-row forage harvesting to convey severed crop stalks from a lower widespread position at the front of the harvester to a relatively narrow throat or discharge zone at the upper rear end of the header directly in front of the feed rolls. The more widespread the crops at the front of the header and the greater the degree of convergence to the rear, the more serious the problem.

The problem has arisen in large measure because the limited width of the discharge zone has made it extremely difficult to crowd all of the outlets of the gathering units into the same area, thus forcing some manufacturers to sacrifice a degree of control over the crop stalks at this location by terminating only the outer gathering elements immediately at the discharge zone and locating the termination of the middle gathering unit (such as in a three row model) somewhat forwardly of the discharge zone. This means, however, that the stalks handled by the middle unit are released much earlier than those of the two outer units, hence inviting entanglement and clogging of the stalks as a result of the lack of control over the same as a result of their premature release.

Some machines, in an effort to provide the high degree of control necessary to achieve orderly, clog-free conveyance to the feed rolls, have utilized a complex maze of gathering elements having several different vertical levels. While the desired extra control might be obtained with such mechanisms, their complexity makes such units excessively costly and invites mechanical failures and subsequent prolonged down time during critical harvesting periods.

One successful effort to provide a less complicated, lower cost and more reliable three row harvesting header, having the desired degree of stalk control, is illustrated in U.S. Pat. No. 3,736,733, issued to Fell, et al, entitled "Three-Row Crop Header for Forage Harvesters", and owned by the assignee of the present invention. The header of that patent successfully achieves more than abundant control over the severed crop stalks with but a single layer of gathering elements, such increased control being possible by virtue of the gathering elements on the middle unit partially overlapping the gathering elements of the two outer units and terminating rearwardly in substantially the same vertical plane at the discharge zone. Thereby, the outlets of all three units are crowded into the same relatively narrow discharge zone and the crop stalks of the middle unit are not released too early for purposes of maintaining firm control thereover.

It has now been found that ∓prerelease" of the middle stream or streams of severed crop stalks is not fatal to achieving orderly, clog-free presentation to the feed rolls as heretofore believed, provided only that the outlets of the middle gathering unit or units are disposed below the level of the outer gathering units. While stalks from the middle units may be released earlier than stalks of the outer units, such is not detrimental to orderly presentation of the middle stalks to the feed rolls because the more elevated stalks of the outer units take over where the middle gathering units leave off and literally pull the middle stalks into the feed rolls with them.

Accordingly, another important object of the present invention is to provide an improvement and an alternative to the approach described and claimed in the aforesaid U.S. Pat. No. 3,736,733.

More particularly, as above set forth, it is an important object of this invention to provide orderly, clog-free conveyance of severed crop stalks to a relatively narrow point of convergence from three or more relatively widespread locations by rearwardly terminating the middle gathering unit or units forwardly of, but at a level slightly below that of, the outer gathering units which at least partially overlap the middle unit or units.

A further important object of the present invention is to obtain substantially uniform stubble height after severance in spite of the fact that the middle gathering unit or units is disposed at a level lower than that of the outer units.

Additionally, it is an important object of this invention to achieve all of the foregoing in a forage harvesting header having a minimum of four separate and distinct crop conveying passages which converge upwardly and rearwardly to a common, relatively narrow discharge zone, such four passages being capable of receiving and handling four separate crop rows as the header is advanced.

Yet another important object of this invention is to provide a unique cutter at the forward end of each passage, respectively, such cutter utilizing a rotary "disc" operating in conjunction with a stationary shear "bar", both of such devices being mounted on and supported by the same side of their corresponding passage. Hence, the clearance between the disc and shear bar for the purpose of achieving a proper shear can be adjusted and maintained with extreme accuracy with complete disregard for the fact that adjacent sides of the passage might rise and fall slightly relative to one another during operation.

In the drawings:

FIG. 1 is a left front perspective view of a 4-row forage harvesting header embodying the principles of the present invention;

FIG. 2 is an enlarged, top plan view of the header taken perpendicular to the inclined plane of the gathering units and with various components, including the fenders, removed to reveal details of construction;

FIG. 3 is a fragmentary, rear elevational view of the header;

FIG. 4 is a schematic, vertical cross-sectional view of the header taken substantially along line 4—4 of FIG. 2 and illustrating the bi-level relationship between the middle and outer gathering elements;

FIG. 5 is an enlarged, fragmentary plan view of the bottom of a typical cutting asembly; and FIG. 6 is an inverted, fragmentary cross-sectional view of the cutting assembly taken along line 6—6 of FIG. 5.

As illustrated in FIG. 1, the header 10, adapted for attachment to a pull-type or self-propelled vehicle through upright mounting arms 12 (one only being shown in FIG. 1), has five downwardly and forwardly inclined snouts 14, 16, 18, 20 and 22, between which are defined four crop passsages 24, 26, 28 and 30, which equip the header 10 for harvesting four crop rows simultaneously. At the upper rear end of the header 10 is located a central discharge zone 32 which is normally positioned immediately ahead of rotating feed rolls (not shown) that receive crop materials from the passages 24–30, compress such materials and project the same rearwardly into a reel-type chopper (also not shown) for comminution thereby. Upright structures 34 and 36 on opposite sides of the zone 32 provide the lateral boundaries for the latter and also serve to support overhead crop control structure commonly referred to as "bull horns" 38. The bull horns 38, in combination with a transverse bar 40 across the upper portion of zone 32, serve to assure that the upright stalks moving through the passages 24–30 toward the zone 32 are gathered inwardly and laid back such that they pass through zone 32 butt first for substantially horizontal presentation to the feed rolls.

The snout housings are removed in FIGS. 2, 3 and 4 to reveal details of construction, and these figures show that support for the snouts 14–22 adjacent their rear ends is provided by a transverse beam 42 that spans the mounting arms 12 on the front side of the latter beneath the snouts 14–22. An additional transverse, structural channel 44 beneath the snouts 14–22 adjacent their forward ends provides support at that location.

FIG. 2 reveals that four independent and distinct gathering units 46, 48, 50 and 52 are presented beneath the snout housings, all of which diverge downwardly and forwardly from the common discharge zone 32. The units 46 and 52 define outer gathering units for the two outermost crop rows of four rows being harvested by the header 10, while the units 48 and 50 present middle gathering units for the two innermost rows of the four crop rows being harvested. The outer units 46 and 52 have inlets 54 to their passages 24 and 30 which are located somewhat forwardly of the corresponding inlets 56 of the passages 26 and 28 for the middle units 48 and 50. Severed crop discharge outlets 58 for the passages 24 and 30 of the outer units 46 and 52 are located in a common vertical plane within the discharge zone 32, while corresponding outlets 60 for the passages 26 and 28 of the middle units 48 and 50 are located in a common vertical plane spaced somewhat forwardly from that of the outlets 58. Each outlet 58 of the outer units 46 and 52 has its own individual, relatively short, crop-receiving pan 62 with upright sidewalls 64, while the outlets 60 of the middle units 48 and 50 share a common, considerably larger crop-receiving pan 66 having upright sidewalls 68.

All of the units 46–52 are substantially identical to one another, the exception only being, of course, that the outer units 46 and 52 are substantially longer than the middle units 48 and 50. Using the outer unit 52 as an example for the moment, it will be seen that the latter is split longitudinally into two halves 70 and 72 on opposite sides of the passage 30. The half 70 carries an endless, lugged gathering element 74 supported at opposite front and rear ends by sprockets 76 and 78, respectively, and having an inner run 74a that extends along and projects laterally into the passage 30. An extensible tensioner 80 on the side 70 is coupled with the front sprocket 76 for extending and retracting the latter to adjust the tension on the gathering element 74.

The other half 72 of unit 52 also has an endless, lugged gathering element 82 supported at its opposite front and rear ends by sprockets 84 and 86, respectively, and having an inner run 82a extending along and projecting laterally into the passage 30 on the side of the latter opposite to the inner run 74a of element 74. The interdigitational relationship of the lugs on the elements 74 and 82 assures that crop stalks are gripped by the latter and conveyed upwardly and rearwardly when inner runs 74a and 82a are operated in that direction. An extensible tensioner 88 on the unit half 72 is operably coupled with a bell crank 90 which, in turn, carries an idler sprocket 92 in engagement with the outer run 82b of element 82 for adjustably tensioning the latter.

The remaining row units 46, 48 and 50 are, as above-mentioned, constructed in a manner similar to the unit 52 and, thus, will not be described in detail. Note that the units 46 and 48 are mirror images of the units 50 and 52, respectively.

As illustrated perhaps best in FIGS. 3 and 4, not only are the outlets 60 of the middle units 48 and 50 spaced forwardly from the outlet 58 of the outer units 46 and 52, their gathering elements 74 and 82 are disposed in a common inclined plane somewhat below that of the elements 74 and 82 of the outer units 46 and 52. Such relative vertical offset between the outer units 46, 52 and the middle units 48, 50 also affects the relationships at the discharge zone 32, and viewing FIG. 3 it may be seen that the pans 62 for the outer units 46 and 48 are located on a level slightly above the common pan 66 for the middle units 48 and 50.

The inlets 56 of the middle units 48 and 50 are set back with respect to the inlets 54 of the outer units 46 and 52 so that all of the inlets, 54 and 56, will be disposed at substantially the same height, notwithstanding the height differential between the gathering elements of the units. Accordingly, each unit 46, 48, 50 and 52 is provided with its own individual standing crop cutter assembly 94, details of which are illustrated in FIGS. 5 and 6. In each case, the assembly 94 is mounted entirely on one side of the corresponding passage 24, 26, 28 or 30, and, in particular, on the unit half 72. Each assembly 94 has a generally triangular support 96 which is secured at its rearmost end to the cross-channel 44 and has a generally upright boss 98 at its forwardmost end that journals a shaft 100. A circular hub 102 is concentrically fixed to the shaft 100 for rotation therewith, and the hub 102 carries a number of generally radially outwardly extending blades 104 having radial cutting edges 106, the hub 102 and its blades 104 thereby presenting a rotary, disc-like cutting device 108.

The cutting assembly 94 also includes a stationary shear bar device 110 that is secured to the underside of support 96 by a pair of bolts 112 and 114. The shear bar 110 is in the nature of a plate 116 which has an outermost shearing edge 118 that is positioned to cooperate with the cutting edges 106 of blades 104 to effect a proper crop shearing action upon rotation of the cutter device 108 in the direction illustrated in FIG. 5. Both devices 108 and 110 project laterally from the unit half 72 into the corresponding passage 24, 26, 28 or 30 for crop engagement and, as illustrated in FIG. 6, a pair of adjusting screws 120 and 122 may be passed through the support 96 into engagement with the formed plate 116 such as to deflect the latter up or down as a result of its inherent resiliency, thereby to vary the vertical gap between the blade 104 and the blade 116 as may be necessary or desirable.

The shaft 100 for each cutting assembly 94 is also used to support the corresponding sprocket 84 such that driving power supplied to the latter through gathering element 82 also serves to rotate the rotary cutter device 108. Such driving power is introduced at the upper rear end of the units 46–52 through the sprockets 78 and 86. Preferably, a hydraulic motor 124 serves as the source of driving power, and the horizontal output shaft 126 of the motor 124 is operably coupled with a first long drive shaft 128 that traverses the header 10 across the rear of the latter. A pair of oppositely facing bevel gears 130 and 132 are fixed to the shaft 128 for rotation therewith on opposite sides of the pan 66 as illustrated in FIG. 3, and tdrive shaft 128 that traverses the header 10 across the rear of the latter. A pair of oppositely facing bevel gears 130 and 132 are fixed to the shaft 128 for rotation therewith on opposite sides of the pan 66 as illustrated in FIG. 3, and the gears 130 and 132 drivingly engage corresponding composite bevel-spur gears 134 and 136, respectively. The spur gear portions of the composite gears 134 and 136, in turn, mesh with adjacent spur gears 138 and 140, respectively. The composite gears 134 and 136 are fixed to upright shafts 142 and 144, respectively, which carry the sprockets 86 of the outer units 46 and 52, while the spur gears 138 and 140 are fixed to upright shafts 146 and 148, respectively, which carry the sprockets 78 of the outer units 46 and 52.

The right end of the first horizontal drive shaft 128 extends outwardly beyond the right mounting arm 12 and is operably coupled through chain and sprocket mechanism 150 to a second, forwardly disposed transverse drive shaft 152. The second drive shaft 152 has four bevel gears 154, 156, 158 and 160, spaced along the latter and secured thereto for rotation therewith. The gears 154–160 mesh with corresponding bevel gears (one only being shown and designated 162 in FIG. 4) for driving the upright shafts 164, 166, 168 and 170 of the sprockets 78 and 86 of inner units 48 and 50, as illustrated in FIG. 2.

OPERATION

The manner of operation of the header 10 should be apparent from the foregoing detailed description of its various components and their relationships. However, a brief explanation at this point may be in order. (Parenthetically, it should be noted that the snouts 14–22 do not, of course, correspond directly in number or position to the four units 46–52. The snout 14 covers the right half 72 of unit 46, while the snout 16 covers the left half 72 of unit 46, plus the right half 70 of middle unit 48. The snout 18 covers not only the left half 72 of middle unit 48, but also the right half 72 of the adjacent middle unit 50. The snout 20 covers the left half 70 of the middle unit 50, as well as the right half 72 of the outer unit 52, while the snout 22 covers only the left half 70 of the outer unit 52.)

As the header 10 is advanced across a field having rows of standing crops thereon, the inlets 54 and 56 of the four passages, 24, 26, 28 and 30, are aligned with four crop rows such that the standing crops are presented to the cutting assemblies 94. The gathering elements 74 on the side of the passages 24–30 opposite to the cutting assemblies 94 make initial contact with the crops of the respective rows such as to begin control over such crops prior to their severance by the assemblies 94. Simultaneously with such severance, the severed stalks become gripped by the inter-digitated lugs of the opposed gathering elements 74 and 82, and the stalks are conveyed upwardly and rearwardly in converging paths of travel through the passages 24–30 for discharge at the zone 32. The stalk severance at the passage inlets 54 and 56 is, of course, made by the rotating blades 104 cooperating with the shearing plates 116.

The stalks traveling through the middle passages 26 and 28 move in an upwardly and rearwardly inclined plane disposed slightly below that of the stalks moving through the outer passages 24 and 30, such being illustrated, for example, in FIG. 4 in which it is seen that the gathering element 82 of the middle unit 48 is in an inclined plane slightly below that of the gathering element 82 of the outer unit 46. The stalks released by the inner units 48 and 50 at outlets 60 flow into the common pan 66; and, although engagement from the gathering elements 74 and 82 has been terminated, such released stalks are pulled rearwardly through the pan 66 by the adjacent converging streams of stalks from the outer units 46 and 52. Such pulling action is augmented by the fact that the streams from the outer units 46 and 52 are somewhat elevated with respect to the streams from the middle units 48 and 50, and as a result, all of the crops are presented in an orderly, clog-free manner to the awaiting feed rolls behind the zone 32. Note in FIG. 2 that the partial overlapping relationship of the outer gathering element runs 82b of outer units 46 and 52 with the gathering elements 74 of the inner units 48 and 50 enables the outlets 58 of the outer units 46 and 52 to be placed directly at the rearmost end of the header 10 within the discharge zone 32. Even though four crop rows can be accommodated by the header 10, there is no sacrifice in compactness and simplicity of design, or an orderly and clog-free crop transfer.

Even though the gathering elements 74 and 82 of the middle units 48 and 50 are placed at a somewhat lower level than their counterparts on the outer units 46 and 52, a substantially uniform stubble height is left by the header 10. This arises because the cutting assemblies 94 of the middle units 48 and 50 are set back with respect to the assemblies 94 of the outer units 46 and 52 sufficiently far that the points of severance along shearing edges 118 of plates 116 all lie in a substantially common horizontal plane. Thus, all stalks conveyed rearwardly into the discharge zone 32 are of substantially the same length which, of course, maximizes the yield which the farmer is capable of obtaining.

It is also to be noted that as a result of supporting both major parts of each cutting assembly 94 on the same side of the respective passages, the vertical gap between the cutting edges 106 and the shearing edges 118 can be very accurately maintained with total disregard for any vibration or other relative movements on the part of the opposite side of the passage as the header 10 is operated. Once a satisfactory gap has been determined and set by the adjusting screws 120 and 122, such gap can be maintained substantially throughout the entire harvesting process without the need for readjustment.

Having thus described the invention, what is claimed as new and desired to be secured by Letters Patent is:

1. In a forage harvesting header having a lower front end and an upper rear end with respect to the normal direction of travel of the header:
   structure defining a crop discharge zone at said upper rear end of the header;
   a pair of elongated, outer, crop-gathering units diverging downwardly and forwardly from said structure for conveying stalks of severed crop material upwardly and rearwardly to said zone from the front end of the header;
   at least one middle crop-gathering unit between said outer units and extending downwardly and forwardly from said structure, said units each having generally fore-and-aft extending, laterally separated, cooperating conveying elements at one level and defining a crop-conveying passage therebetween that follows the longitudinal axis of its unit, each passage having a standing crop inlet adjacent said front end of the header and a severed crop outlet adjacent said rear end of the header;

crop cutter means located adjacent said inlets of the passages for severing standing crops entering the same during advancement of the header, said passage of the middle unit having its outlet to said zone spaced forwardly from the outlets of the passages of said outer units, and said elements of the outer units being disposed above and at least partially overlapping elements of said middle unit adjacent said outlet of the middle unit; and means associated with said units for leaning back the severed stalks of all units as they approach said zone and for leaning inwardly toward one another the severed stalks of said outer units as they approach said zone whereby to assist in the clog-free conveyance of the severed stalks in a butt-first attitude through said zone.

2. In a forage harvesting header as claimed in claim 1, wherein said elements of the outer units lie in a common upwardly and rearwardly inclined plane, said elements of the middle unit lying in an upwardly and rearwardly inclined plane that is parallel to and lower than said plane of the elements of the outer units.

3. In a forage harvesting header as claimed in claim 2, wherein said passage inlet of the middle unit is set back with respect to the passage inlets of the outer units, the cutter means at said passage inlet of the middle unit being at substantially the same height as the cutter means at said passage inlets of the outer units.

4. In a forage harvesting header as claimed in claim 3, wherein said cutter means comprises an independent assembly for each passage.

5. In a forage harvesting header as claimed in claim 4, wherein each of said assemblies includes a rotary cutting device.

6. In a forage harvesting header as claimed in claim 5, wherein each of said assemblies further includes a stationary shear device in position to cooperate with said cutting device.

7. In a forage harvesting header as claimed in claim 6, wherein both of said devices are mounted on the same side of their common passage.

8. In a forage harvesting header as claimed in claim 6, wherein the point of cooperation between the shear device and the cutting device of the passage of the middle unit is set back with respect to, but is at substantially the same height as, the corresponding points of the outer units.

9. In a forage harvesting header as claimed in claim 1, wherein is provided a pair of said middle units diverging forwardly away from said zone.

10. In a forage harvesting header having a lower front end and an upper rear end with respect to the normal direction of travel of the header:

structure defining a crop discharge zone at said upper rear end of the header;

a pair of elongated, outer, crop-gathering units diverging downwardly and forwardly from said structure for conveying severed crop material upwardly and rearwardly to said zone from the front end of the header;

a pair of middle crop-gathering units between said outer units and extending downwardly and forwardly from said structure, said units each having a single level of generally fore-and-aft extending, laterally separated, cooperating conveying elements defining a crop-conveying passage therebetween that follows the longitudinal axis of its unit, each passage having a standing crop inlet adjacent said front end of the header and a severed crop outlet adjacent said rear end of the header; and crop cutter means located adjacent said inlets of the passages for severing standing crops entering the same during advancement of the header, said passage of the middle unit having its outlet to said zone spaced forwardly from the outlets of the passages of said outer units, and said elements of the outer units being disposed above and at least partially overlapping elements of said middle unit adjacent said outlet of the middle unit, the outlet of each outer unit being in substantial fore-and-aft alignment with the inlet of the next adjacent middle unit.

11. In a forage harvesting header as claimed in claim 10; and means associated with said units for leaning back the severed stalks of all units as they approach said zone and for leaning inwardly toward one another the severed stalks of said outer units as they approach said zone whereby to assist in the clog-free conveyance of the severed stalks in a butt-first attitude through said zone.

12. In a forage harvesting header having a lower front end and an upper rear end with respect to the normal direction of travel of the header:

structure defining a crop discharge zone at said upper rear end of the header;

a pair of elongated, outer, crop-gathering units diverging downwardly and forwardly from said structure for conveying severed crop material upwardly and rearwardly to said zone from the front end of the header;

a pair of middle crop-gathering units between said outer units and extending downwardly and forwardly from said structure, said units each having a single level of generally fore-and-aft extending, laterally separated, cooperating conveying elements defining a crop-conveying passage therebetween that follows the longitudinal axis of its unit, each passage having a standing crop inlet adjacent said front end of the header and a severed crop outlet adjacent said rear end of the header; and crop cutter means located adjacent said inlets of the passages for severing standing crops entering the same during advancement of the header, said passage of the middle unit having its outlet to said zone spaced forwardly from the outlets of the passages of said outer units, and said elements of the outer units being disposed above and at least partially overlapping elements of said middle unit adjacent said outlet of the middle unit, the angle of divergence of said middle units being less than the angle of divergence of said outer units.

13. In a forage harvesting header as claimed in claim 12, wherein the outlet of each outer unit is in substantial fore-and-aft alignment with the inlet of the next adjacent middle unit.

14. In a forage harvesting header as claimed in claim 13, wherein said elements of the outer units lie in a common upwardly and rearwardly inclined plane, said elements of the middle units lying in an upwardly and rearwardly inclined plane that is parallel to and lower than said plane of the elements of the outer units.

15. In a forage harvesting header as claimed in claim 14, wherein said cutter means includes a rotary device for each passage, the devices of the middle units being set back with respect to, but at substantially the same height as, the devices of the outer units.

16. In a forage harvesting header as claimed in claim 15, wherein said cutter means further includes a stationary shear deivce for each rotary device, both of said devices being mounted on the same side of the passage.

17. In a forage harvesting header as claimed in claim 12; and means associated with said units for leaning back the severed stalks of all units as they approach said zone and for leaning inwardly toward one another the severed stalks of said outer units as they approach said zone whereby to assist in the clog-free conveyance of the severed stalks in a butt-first attitude through said zone.

* * * * *